May 3, 1932.　　　　　J. ROUX　　　　　1,856,170
ROLLING MILL
Filed June 10, 1929
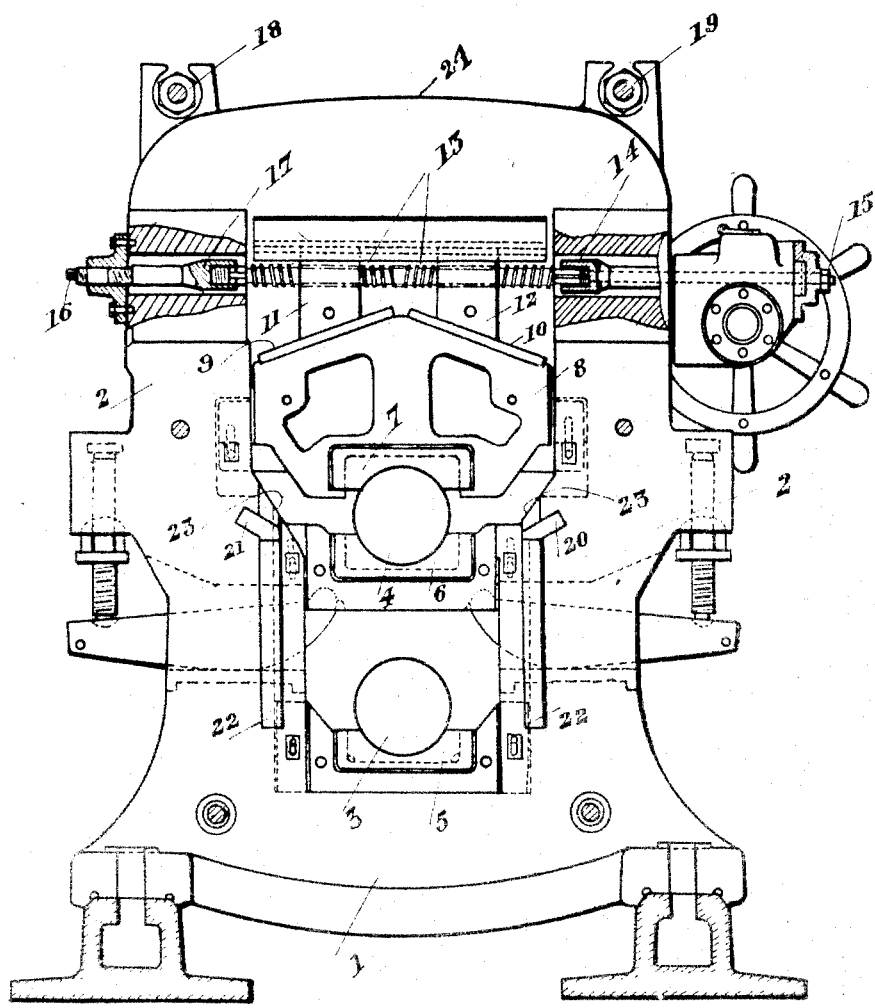
Inventor:
Jacques Roux Patented May 3, 1932

1,856,170

UNITED STATES PATENT OFFICE

JACQUES ROUX, OF ISBERGUES, PAS-DE-CALAIS, FRANCE

ROLLING MILL

Application filed June 10, 1929, Serial No. 369,644, and in Belgium June 25, 1928.

This invention relates to rolling mills.

The object of the invention is to avoid elastic deformations which are harmful for the precision of rolling, to allow a precise adjustment of the rollers to be obtained by simple means, and to reduce the importance of the play between the last pieces.

It has previously been proposed in universal rolling mills for H-girders, to use two horizontal and two vertical rollers, the axes of which are all in the same plane, and to adjust the distance between the two vertical rollers by a displacement of counter-wedges which is parallel to the plane of the four axes.

It has also been proposed in roller mills in which the bearings of one roller are fixed and the bearings of the other roller are adjustable, to fit the axle of the fixed roller with members which, by a displacement symmetrical to the plane containing the axes of the two rollers, cause a displacement of a ring acting upon the axle of the adjustable roller, thereby adjusting the distance between the two rollers.

The present invention consists in a rolling mill housing in which a movable roller is adjusted in such a manner that during the rolling operation it bears upon the columns through the intermediary of members adapted to adjust its lifting and are symmetrical relatively to a plane as defined below and are interconnected in such a manner that their symmetry is maintained for each regulation, and in which the various parts are so positioned that the roller, the lifting of which is adjusted, has on the one side the said symmetrical members and on the other side the other roller or rollers.

The said plane is defined as follows: In the case of a rolling mill having two parallel rollers, called "duo rolling mill", it contains the axes of the rollers; in the case of a rolling mill having three parallel rollers, called "trio rolling mill", it contains the three axes which are in one plane; in the case of a rolling mill with four parallel rollers, called "double duo", it contains the axes of the rollers of one "duo" and another plane contains the axes of the rollers of the other "duo" and the invention can be applied twice.

In the case of a rolling mill for tubes type Mannesmann, having two rollers which are not parallel, it contains the axis of the roller which can be adjusted and the line of shortest distance between the axes of the two rollers; in the case of a rolling mill having three rollers, the axes of which are generating lines of a hyperboloid, such as for instance a machine for screw treading, it contains the axis of the adjustable roller and the point situated at equal distance, which is also the shortest distance, from the three axes.

The adjusting members consist preferably of wedges operated by one screw, which is right- and lefthanded, the said wedges exerting their pressures upon an intermediate block or the like which receives the effort from one end of the roller. It is proceeded in the same way for the other end and a mechanical connection may ensure a simultaneous adjustment of the two ends of the roller. This, however, is not essential.

Another characteristic feature of the invention is that the distance between the uprights of the columns forming the housing may be increased for at least part of their lengths near the adjusting members.

The accompanying drawing shows by way of example, in a sectional elevation, a column of an enclosed housing according to the invention.

A rolling mill housing is formed of two columns, one of which is shown in the drawing by the numeral 1, and which comprises two uprights 2 between which are placed the trunnions 3, 4 of the rollers, resting in bearings 5, 6, 7.

The upper bearing 7 rests against a block or the like 8, which has at its upper part two inclined planes 9, 10 upon which can slide the wedges 11, 12 operated by a screw 13 which is right- and lefthanded.

The wedges 11, 12 can be symmetrically displaced by means of the screw 13 in any suitable manner, for instance in the following manner:

One of the ends of this screw is operated by a socket wrench 14 which may be operated either through the intermediary of an endless screw or direct by a wheel. A symmetrical displacement of the wedges is ensured by resilient stops arranged at the ends of the operating screw. On the side of the driving means the resilient stop may be formed of a screw 15 traversing the socket-wrench 14; on the other side, it may be formed of a screw 16 ended by a round socket 17. In the bottom of each socket a few Belleville washers may be placed, that is, convex washers acting in the manner of springs. Such washers may be replaced by a somewhat plastic substance. Each column is enclosed by an upper transverse member 24.

The distance between the uprights 2, 2 is greater near the wedges than at their other end; this allows a greater displacement of the wedges to be obtained, and also of removing in an easy manner the rollers, by passing them obliquely between the two columns which form the housing.

The grooves 22 for fixing the member which serves as a support to the guide-bars (not shown) for the piece which is being rolled may open at their upper part, at 23; in this case the grooves 22 are closed at their upper part by pieces 20, 21.

A cage according to the present invention allows of obtaining in practice a very satisfactory lifting or tightening: 4 inches for a rolling mill known as a 25 inch mill with incline of $\frac{1}{3}$.

The upper cross-members 18, 19 are arranged so as to be easily removable. In the drawing, they are shown at the upper part.

The wedges may be made of cast steel with brass nuts cast in a recess of these wedges and heated to red so as to obtain a perfect adherence. The inclination of the tangent of the angle of these wedges may vary between $\frac{1}{3}$ and $\frac{1}{4}$; these limits however may be widened.

It is to be understood that the present invention does not apply only to ordinary rolling mills for hot or cold rolling but that it also applies to any special housings for rolling mills, such as the Mannesmann. It is known that in a Mannesmann rolling mill the axes of the rollers are situated in different planes.

It is of course understood that the invention is not limited to the various details described. Thus, double wedges may also be disposed below the lower roller as it is already known for open housings; but in this case, the distance between the uprights of the columns should be sufficiently great, at least at the upper part of the columns, for permitting to mount and dismount the rollers by placing them in a deviated position relatively to their working position, between the two closed columns which form the housing.

The present invention has the great advantage of comprising adjustment members which do not traverse the upper part or the lower part of the columns of the housing, and thus the parts of the housing which are subjected to bending are not weakened.

When the said adjustment members are arranged below the lower roller, the distance between the uprights may be increased near the said adjustment members for permitting a greater amplitude in their movement, but the distance between the uprights at the upper part of the latter should be at least sufficient for permitting the mounting or dismounting of the rollers, as said above.

I claim:

1. A rolling mill housing having enclosed columns, rollers, two wedges for adjusting each end of one roller, one right- and left-handed screw at each end of said roller for adjusting the wedges at the ends of said roller, said wedges being symmetrical relatively to a plane as defined by the axis of said roller and a point of the axis of another roller and being interconnected in such a manner that their symmetry is maintained for each adjustment of the ends of the roller, the latter roller being positioned between the said wedges and another roller, and a block positioned between the wedges and the adjustable roller, and resting upon the adjustable roller, upon which block the said wedges exert their pressures, as set forth.

2. A rolling mill housing having two enclosed columns with uprights, rollers, two wedges for adjusting each end of one roller, one right- and left-handed screw at each end of said roller for adjusting the wedges at the ends of said roller, said wedges being symmetrical relatively to a plane as defined by the axis of said roller and a point of the axis of another roller and being interconnected in such a manner that their symmetry is maintained for each adjustment of the ends of the roller, the latter roller being positioned between the said wedges and another roller, a block, the said block bearing upon the adjustable roller and bearing sideways upon the uprights of the columns, the distance between these uprights being increased by an amount at least sufficient to permit the rollers to be mounted and dismounted by passing them in a deviated position relatively to their working position between the two enclosed columns forming the housing, as set forth.

JACQUES ROUX.